O. M. MUNDALE.
FUEL MIXING DEVICE FOR INTERNAL COMBUSTION ENGINES.
APPLICATION FILED APR. 7, 1919.
1,420,732.
Patented June 27, 1922.
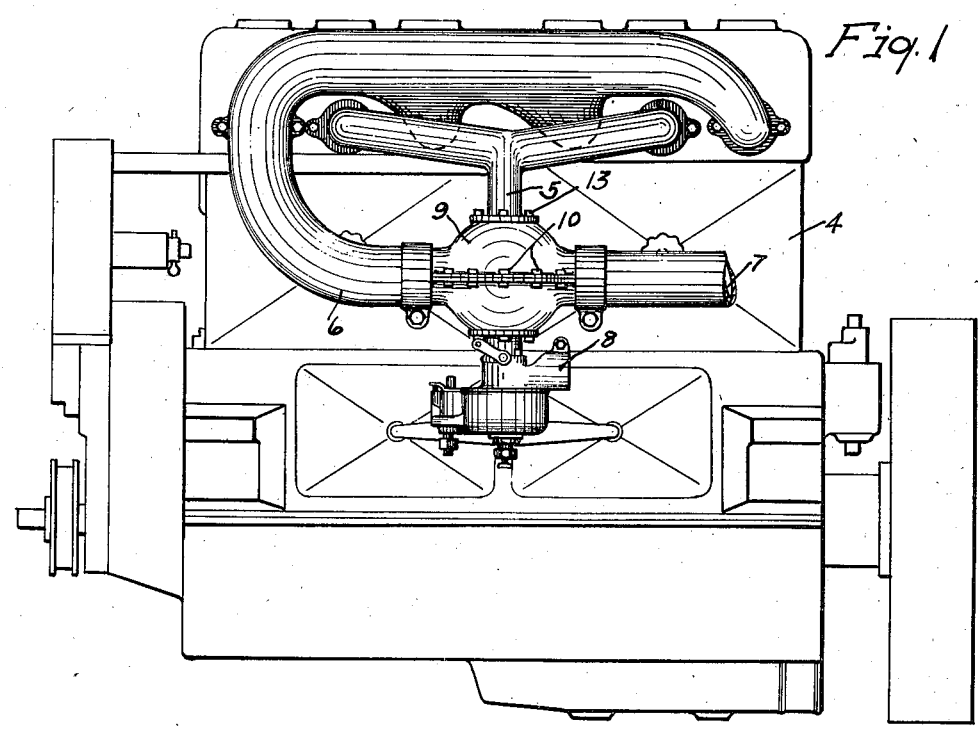
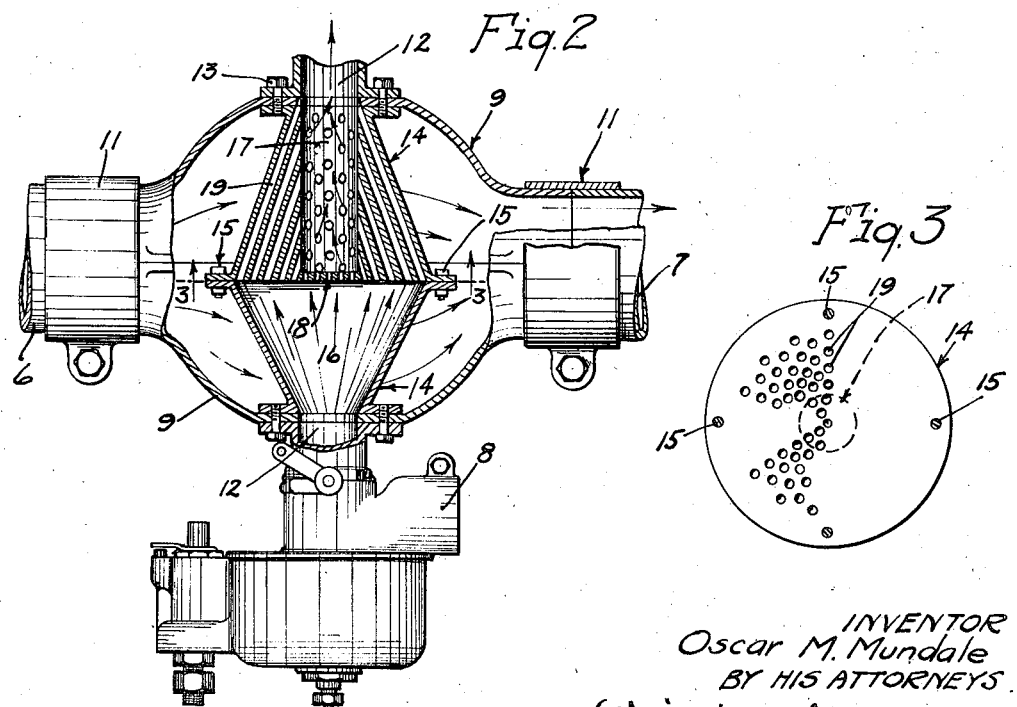
INVENTOR
Oscar M. Mundale
BY HIS ATTORNEYS

UNITED STATES PATENT OFFICE.

OSCAR M. MUNDALE, OF FROST, MINNESOTA.

FUEL-MIXING DEVICE FOR INTERNAL-COMBUSTION ENGINES.

1,420,732.  Specification of Letters Patent.  Patented June 27, 1922.

Application filed April 7, 1919. Serial No. 288,198.

*To all whom it may concern:*

Be it known that I, OSCAR M. MUNDALE, a citizen of the United States, residing at Frost, in the county of Faribault and State of Minnesota, have invented certain new and useful Improvements in a Fuel-Mixing Device for Internal-Combustion Engines; and I do hereby declare the following to be a full, clear, and exact description of the invention, such as will enable others skilled in the art to which it appertains to make and use the same.

My invention has for its object to provide an improved fuel vaporizer for internal combustion engines; and, to this end, it consists of the novel devices and combinations of devices hereinafter described and defined in the claims.

In the accompanying drawings, which illustrate the invention, like characters indicate like parts throughout the several views.

Referring to the drawings,

Fig. 1 is a view in side elevation of an internal combustion engine having the invention incorporated therein;

Fig. 2 is a view partly in side elevation and partly in central vertical section of the invention removed from the engine and also illustrating the carbureter and connected portions of the intake manifold, exhaust manifold and exhaust pipe, on an enlarged scale; and Fig. 3 is a detail view with some parts sectioned on the line 3—3 of Fig. 2.

The internal combustion engine illustrated is indicated as an entirety by numeral 4, with the exception of the intake manifold 5, exhaust manifold 6, exhaust pipe 7, and carbureter 8. The invention includes a housing interposed between the exhaust manifold 6 and exhaust pipe 7 and affords an expanded section thereof. This housing 9, as shown, is horizontally divided and the sections thereof are flanged and connected by nut-equipped bolts 10 passed through said flanges. The ends of the housing 9 are contracted to the same diameter of the adjacent ends of the exhaust manifold 6 and exhaust pipe 7 and connected thereto by clamping bands 11. The top and bottom of the housing 9 are flattened and provided with vertically aligned holes 12. To the flattened top of the housing 9, is rigidly secured by cap screws 13 the receiving end of the intake manifold 5, which is aligned with the respective opening 12. The carbureter 8 is secured also by cap screws 13 to the flattened bottom of the housing 9 with its vapor conduit aligned with the respective opening 12 in said housing.

Within the housing 9, is located the improved fuel heater and vaporizer which includes a casing 14 and affords a communicating connection between the carbureter 8 and intake manifold 5 and is spaced apart from the walls of said housing to afford clearance for the passage of the hot exhaust from the engine therearound. The casing 14 comprises a lower section and an upper section having at their abutting ends outturned flanges through which are passed nut-equipped bolts 15, which detachably connect said section. Both sections of the casing 14 are contracted from their inner ends toward their outer ends and which outer ends are provided with outturned flanges rigidly secured to the housing 9 by the cap screws 13.

The lower section of the casing 14 affords a vapor expanding or distributing chamber 16 having communication with the vapor conduit of the carbureter 8 through the respective hole 12. In the upper section of the casing 14, is formed a cylindrical vapor collecting chamber 17 of substanially the same diameter as the intake manifold 5, axially aligned therewith and having communication with said manifold through the respective hole 12. A perforated partition 18 is interposed in the receiving end of the collecting chamber 17. Circumferentially and radially spaced upwardly converging flues 19 are formed in the upper section of the casing 14 around the collecting chamber 17 and open through the walls thereof.

From the above description, it is evident that the vapor from the distributing chamber 16, within which the vapor from the carbureter has a chance to spread out and expand, is drawn through the perforated partition 18 and flues 19 and into the collecting chamber 17, under the suction stroke of the engine. The perforated partition 18 and flues 19 separate the vapor into fine streams, which are quickly and thoroughly heated by the exhaust passing around the casing 14 and further vaporized and heated just before the fuel is taken into the cylinders of the engine.

The above described invention is extremely simple, of comparatively small cost to manufacture, and can be very quickly applied to an engine.

What I claim is:

1. In an internal combustion engine having an intake manifold and a carbureter, a fuel vaporizer disposed above the carbureter comprising a distributing chamber in communication with the upper end of the carbureter, and a collecting chamber in communication with the intake manifold in the engine, a perforated partition between said two chambers, and a plurality of flues disposed about said partition communicating at their lower ends with the distributing chamber and at their upper ends with the collecting chamber.

2. The combination with an internal combustion engine and a carbureter therefor, of a fuel vaporizer having a distributing chamber in communication with the vapor conduit of the carbureter and a collecting chamber in communication with the intake manifold of the engine, a perforated partition between said two chambers, and a plurality of converging flues circumferentially and radially spaced around said partition, leading from the distributing chamber and opening through the walls of the collecting chamber.

In testimony whereof I affix my signature in presence of two witnesses.

OSCAR M. MUNDALE.

Witnesses:
J. O. MALAND,
F. L. PARSO.